US010621002B2

(12) United States Patent
Lu et al.

(10) Patent No.: US 10,621,002 B2
(45) Date of Patent: Apr. 14, 2020

(54) ITERATIVE TASK CENTRIC RESOURCE SCHEDULING FOR A USER PROGRAM BETWEEN DIFFERENT COMPUTING FRAMEWORKS

(71) Applicant: Pivotal Software, Inc., San Francisco, CA (US)

(72) Inventors: Yuquan Lu, Shanghai (CN); Milind Arun Bhandarkar, San Jose, CA (US); Wangda Tan, Shanghai (CN); Jimmy Haijun Cao, Shanghai (CN)

(73) Assignee: Pivotal Software, Inc., San Francisco, CA (US)

( * ) Notice: Subject to any disclaimer, the term of this patent is extended or adjusted under 35 U.S.C. 154(b) by 104 days.

(21) Appl. No.: 15/122,131

(22) PCT Filed: Feb. 28, 2014

(86) PCT No.: PCT/CN2014/072751
§ 371 (c)(1),
(2) Date: Aug. 26, 2016

(87) PCT Pub. No.: WO2015/127668
PCT Pub. Date: Sep. 3, 2015

(65) Prior Publication Data
US 2016/0378560 A1    Dec. 29, 2016

(51) Int. Cl.
*G06F 9/50* (2006.01)
*G06F 9/52* (2006.01)

(52) U.S. Cl.
CPC .......... *G06F 9/5066* (2013.01); *G06F 9/5055* (2013.01); *G06F 9/52* (2013.01)

(58) Field of Classification Search
CPC ......... G06F 9/5066; G06F 9/52; G06F 9/5055
See application file for complete search history.

(56) References Cited

U.S. PATENT DOCUMENTS 6,370,560 B1 * 4/2002 Robertazzi ............ G06F 9/5066
718/100
7,664,859 B2 * 2/2010 Kudo ....................... G06F 9/505
709/223
(Continued)

FOREIGN PATENT DOCUMENTS

CN    103164287    6/2013
CN    103500123    1/2014

OTHER PUBLICATIONS

International Search Report and Written Opinion in International Application No. PCT/CN2014/072751, dated Dec. 1, 2014, 11 pages.

*Primary Examiner* — Camquy Truong
*Assistant Examiner* — Michael W Ayers
(74) *Attorney, Agent, or Firm* — Fish & Richardson P.C.

(57) ABSTRACT

Methods, systems, and apparatus, including computer programs encoded on computer storage media, for a task centric resource scheduling framework. A scheduler executing on a master node computer of a distributed parallel computing system allocates computing resources of the parallel computing system to a program according to one or more policies associated with the program. Each policy includes a set of pre-determined computing resource constraints. Allocation of the computing resources includes performing multiple iterations of negotiation between the scheduler and a resource manager of the parallel computing system. In each iteration, a policy engine of the scheduler submits requests to get more resources from, or requests to release already acquired resources to, the resource manager. The policy engine generates the requests by balancing suggestions provided by analyzer components of the policy engine and a corresponding policy. The policy engine can then determine an allocation plan on how to allocate resources.

21 Claims, 5 Drawing Sheets

(56) References Cited

U.S. PATENT DOCUMENTS

| | | | |
|---|---|---|---|
| 8,082,549 B2* | 12/2011 | Corley, Jr. | G06F 9/52 |
| | | | 706/19 |
| 8,291,411 B2* | 10/2012 | Beaty | G06F 9/4856 |
| | | | 718/1 |
| 8,832,694 B2* | 9/2014 | Kang | G06F 9/50 |
| | | | 718/100 |
| 9,038,068 B2* | 5/2015 | Engle | G06F 9/5022 |
| | | | 718/1 |
| 9,239,996 B2* | 1/2016 | Moorthi | G06Q 10/06 |
| 9,356,883 B1* | 5/2016 | Borthakur | H04L 41/5025 |
| 9,858,095 B2* | 1/2018 | Breitgand | G06F 9/45533 |
| 2006/0195846 A1* | 8/2006 | Benedetti | G06F 9/5027 |
| | | | 718/102 |
| 2010/0023723 A1 | 1/2010 | Archer et al. | |
| 2010/0241881 A1 | 9/2010 | Barsness et al. | |
| 2013/0179895 A1* | 7/2013 | Calder | G06F 9/5077 |
| | | | 718/104 |
| 2016/0378560 A1 | 12/2016 | Lu et al. | |

\* cited by examiner

ITERATIVE TASK CENTRIC RESOURCE SCHEDULING FOR A USER PROGRAM BETWEEN DIFFERENT COMPUTING FRAMEWORKS

BACKGROUND

This specification relates to parallel computing.

In parallel computing, a large program can be divided into multiple smaller ones. The smaller programs are distributed to multiple interconnected computers, and executed in parallel to one another. Parallel computing has been implemented using various frameworks, each including framework-unique protocols, libraries, tool sets, and application programing interfaces (APIs).

Some parallel computing frameworks are based on a message passing interface (MPI) standard. MPI standards generally include a set of protocols defining syntax and semantics of various library routines for message passing and specifying how programs behave in a parallel computing system. A program written according to an MPI standard can execute on a cluster of computers of a corresponding MPI framework.

SUMMARY

A distributed parallel computing system automatically adapts a foreign program to execute on a parallel computing system. A foreign program is a program written for a computing framework that is different from a computing framework of the parallel computing system. The distributed parallel computing system includes a master node computer and one or more worker node computers. A scheduler executing on the master node computer acts as an intermediary between the foreign program and the parallel computing system. The scheduler negotiates with a resource manager of the parallel computing system to acquire computing resources. The scheduler then allocates the computing resources as individual containers on the worker node computers. The foreign program executes in the containers on the worker node computers in parallel.

The scheduler allocates the computing resources of the parallel computing system according to one or more policies associated with the foreign program. Each policy includes a set of pre-determined computing resource constraints. Allocation of the computing resources includes performing multiple iterations of negotiation between the scheduler and a resource manager of the parallel computing system. In each iteration, a policy engine of the scheduler submits requests to get more resources from, or requests to release already acquired resources to the resource manager. The policy engine generates the requests by balancing suggestions provided by analyzer components of the policy engine and a corresponding policy. The policy engine can then determine an allocation plan on how to allocate resources from one or more worker node computers of the parallel computing system to the foreign program.

Particular embodiments of the subject matter described in this specification can be implemented to realize one or more advantages. Programs can be executed in a non-native environment. Accordingly, for example, a user can run jobs suitable for an MPI framework on a parallel processing system that is not MPI compliant. These techniques reduce efforts required to port programs written under one framework to another paradigm framework.

The techniques can make a first computing framework available in a new platform, e.g., a virtualized cloud platform, supported by a second computing framework. Accordingly, porting software between platforms is simplified. Specifically, the techniques can make porting programs to a parallel computing system easier.

The techniques can make it possible to combine the advantages from two computing frameworks to support new use cases which are supported by neither one individually. For example, a user can build a data pipeline application that includes Map-Reduce processing, which is supported by the first computing framework, and an MPI based computing model, which is supported by the second computing framework.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
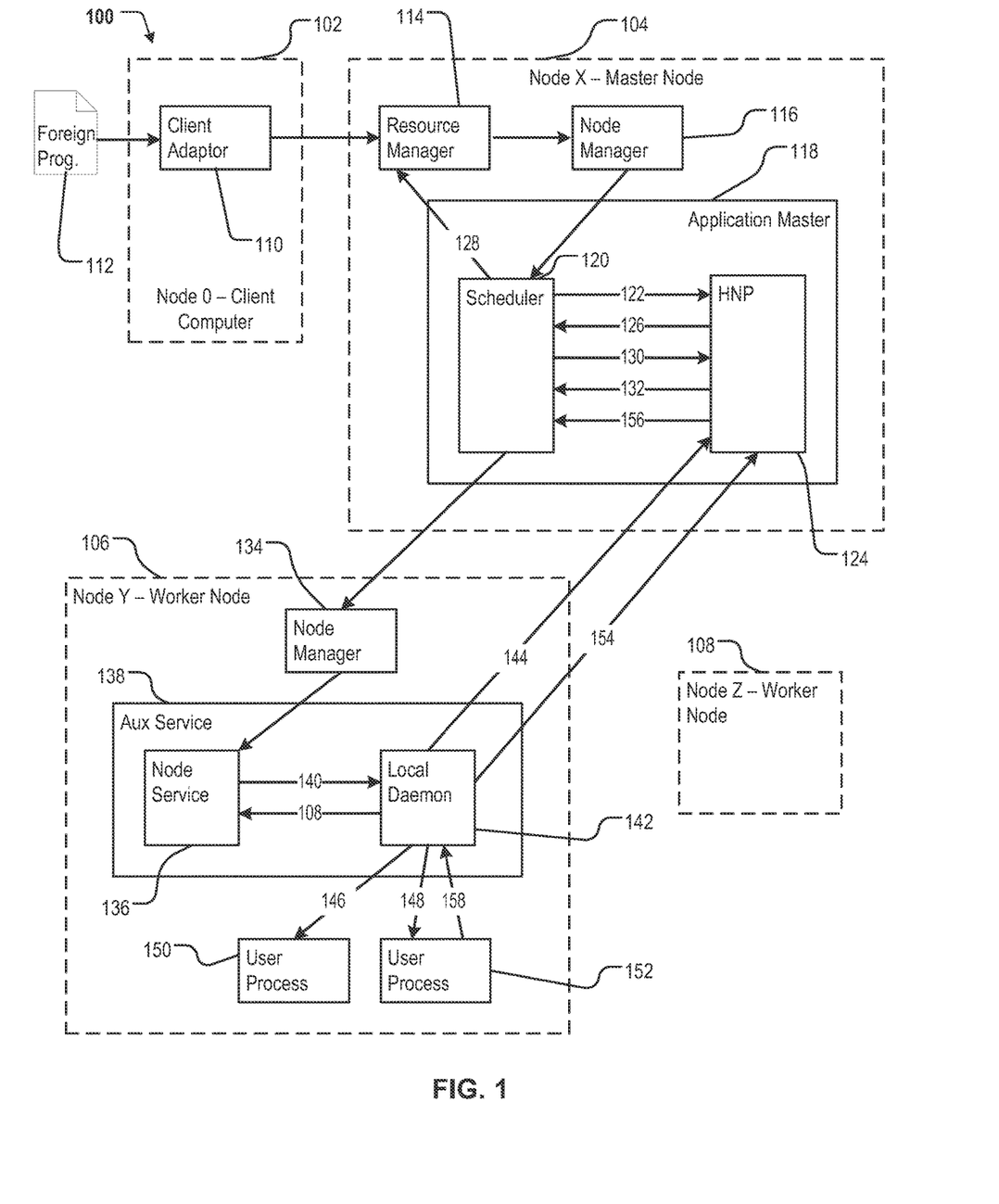
FIG. 1 is a block diagram of an example parallel computing system configured to execute a foreign program.

FIG. 1 is a block diagram of an example parallel computing system 100 configured to execute a foreign program. The system 100 includes a cluster of multiple nodes. Each node is computer configured to perform various roles as defined in a computing framework of the system 100. In the example shown, the system 100 is an Apache™ Hadoop® compliant system. ("Hadoop" is a trademark of the Apache Software Foundation.) In various implementations, the system 100 can be a system of a framework other than Hadoop.

The system 100 includes a client computer 102 programmed to receive a user program 112. The system 100 includes master node computer 104 and one or more worker node computers, e.g., worker node computer 106 and worker node computer 108. The master node computer 104 is a computer configured to manage distributed storage of data and manage parallel computation on the data by the worker node computers 106 and 108. For example, the master node computer 104 can provide instructions of data storage and computation to the worker node computers 106 and 108. The worker node computers 106 and 108 are computers configured to store the data and perform the computations according to the instructions received from the master node computer 104.

The client computer 102 is a computer of the system 100 that executes a client adaptor 110 for receiving user program 112. The user program 112 is a foreign program, where the framework of the user program 112 is a foreign framework that is different from the framework of the system 100. The user program 112 includes program code written for the foreign framework, e.g., a framework under an MPI standard.

The client adaptor 110 is a component of the client computer that notifies a resource manager 114 that a user requests that the system 100 execute the user program 112. The resource manager 114 is component of the system 100 that includes a process that executes on a master node or worker node of a cluster. The process of the resource manager manages job scheduling and execution of the cluster. The resource manager 114 also manages resource allocation globally in a cluster. An example of the resource manager 114 is a resource manager following a YARN™ ("yet another resource negotiator") protocol.

The resource manager 114 schedules execution of the user program 112 in coordination with a master node manager 116 of the master node computer 104. The master node manager 116 is a component of the master node computer 104. The master node manager 116 includes a process that manages communication between processes of master node computer 104 and the resource manager 114. Upon receiving a request from the resource manager 114, the master node manager 116 launches an application master 118. The application master 118 is a component of the master node computer 104 that includes a process executed on the master node computer 104 that manages task scheduling and execution of the user program 112 on multiple worker node computers, and allocates computing resource for the user program 112. Launching the application master 118 through the master node manager 116 can be performed under a YARN resource manager application master ("YARN RM-AM") protocol.

The application master 118 includes a scheduler 120. The scheduler 120 is a component of the application master 118 that performs resource allocation according to protocols of the foreign framework. The scheduler 120 launches (122) a head node process ("HNP") 124. The HNP 124 is a job master instance under the foreign framework. The HNP 124 manages and monitors execution of the user program 112. The HNP 124, once started, causes the system 100 to execute the user program 112 on the worker node computers 106 and 108.

The HNP 124 requests (126) the scheduler 120 to schedule computing resources with the resource manager 114. The scheduler 120 then negotiates (128) with the resource manager 114 in YARN application master resource manager ("YARN AM-RM") protocol to allocate required computing resources using a policy driven paradigm. Additional details of the policy driven paradigm are described below in reference to FIGS. 2 and 3. The scheduler 120 provides (130) allocated computing resources to the HNP 124. The allocated resources are designated as containers. Each container includes one or more resources, e.g., a memory block or file system section, of a node computer in a cluster. Each container is scheduled, e.g., acquired and released, by the resource manager 114 and supervised by a worker node manager 134 of the respective worker node computer where the container resides. Each node computer can have multiple containers. Upon receiving the containers, the HNP 124 divides the user program 112 into tasks that execute on worker node computers 106 and 108. The HNP 124 assigns the tasks to the worker node computers 106 and 108, and maps the containers of the worker node computers 106 and 108 to the respective tasks. The HNP 124 then calls (132) the scheduler 120 to launch the tasks, including to launch one or more user processes once the worker node computers 106 and 108 to perform the jobs in parallel. The call 132 is a non-blocking call where the caller does not block other operations while waiting for a response. After the HNP 124 made the call 132, the HNP 124 can enter an infinite loop until interrupted by operations that are described later.

In the example shown, launching the jobs will be described in reference to the worker node computer 106. The scheduler 120 launches the task on the worker node computer 106 by contacting a worker node manager 134. The worker node manager 134 is a component of the worker node computer 106 that includes a process executing on the worker node computer 106. The worker node manager 134 manages life cycle of the container allocated to the worker node computer 106 for performing the task assigned to the worker node computer 106. In some implementations, the communication between the scheduler 120 and the worker node manager 134 can be accomplished under YARN application master-node manager ("YARN AM-NM") protocol. The scheduler 120 invokes worker node managers on all nodes including, on worker node computer 106 and (not shown) on worker node computer 108 in parallel.

The worker node manager 134 receives a call to launch the task on worker node computer 106 from the scheduler 120. In response, the worker node manager 134 starts a node service 136. The node service 136 is a component of the worker node computer 106 that includes process customized for the task. In some implementations, the node service 136 is deployed as a YARN auxiliary service 138 managed by the worker node manager 134. The YARN auxiliary service 138 is a component of YARN that manages the node service 136. Some examples of customization include starting, stopping, and managing the local daemons 142, and monitoring or invoking the local daemons 142. The worker node manager 134 invokes an interface component in the node service 136 to launch user processes and then terminates the YARN AM-NM protocol call initiated by the scheduler 120.

The node service 136 manages containers allocated to the user program 112 at level of worker node computer 106. The worker node manager 134 passes the containers to the node service 136. In some implementations, the containers can include YARN specific context information and location of a file system that the user program 112 can use on the worker node computer 106. The node service 136 then requests (140) a local daemon 142 to start all user processes on the worker node computer 106 to perform tasks of the user program 112.

The local daemon 142 is a component of the worker node computer 106 that manages the user processes. Once started, the local daemon 142 registers (144) with the HNP 124. The local daemon 142 performs local spawns 146 and 148. The local spawns 146 and 148 launch user processes 150 and 152, respectively. The user processes 150 and 152 can perform different portions of the job allocated to the worker node computer 106. The user processes 150 and 152, once started, each enter a barrier by calling an initialization procedure. The barrier is a state where the user processes 150 and 152 awaits further instructions before continue execution. The initialization procedure synchronizes all user processes to ensure all have started. The local daemon 142 then enters a loop to monitor execution status of the user processes 150 and 152 by listening for messages from the user processes 150 and 152.

Each local daemon, including the local daemon 142 executing on the worker node computer 106 and a local daemon executing on the worker node computer 108 (not shown), reports (154) to the HNP 124 upon determining that each user process spawned by the respective local daemon has entered the barrier through the initialization procedure.

The report interrupts the loop of the HNP 124. The HNP 124, upon receiving reports from all registered local daemons, reports (156) to the scheduler 120 that the user program 112 is ready to execute in parallel on each worker node computer. The HNP 124 notifies each local daemon to cause the user processes to exit the barrier. Once the user processes 150 and 152 exit the barrier, the user processes 150 and 152 start performing the jobs of the user program 112. The HNP 124 then enters a loop to monitor states of execution of the user program 112 by listening for messages from all local daemons including local daemon 142. Each user process, e.g., the user process 152, notifies (158) the parent local daemon, e.g., local daemon 142, of execution status. Each local daemon then reports the states to the HNP 124. The HNP 124 can report to the client computer 102 upon determining that all user processes have terminated.

Figure 2:
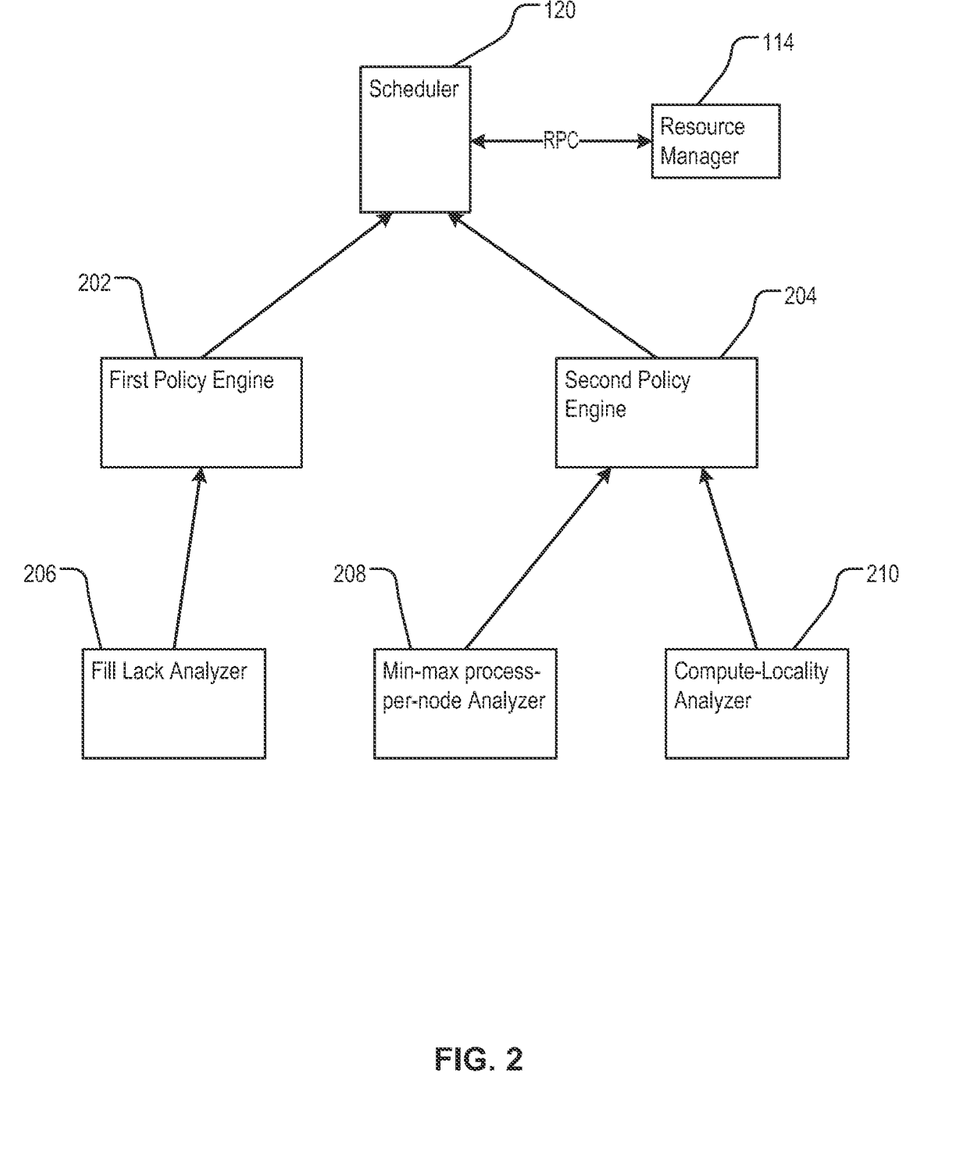
FIG. 2 is a block diagram illustrating arm example of policy-based resource allocation in a parallel computing system.

FIG. 2 is a block diagram illustrating an example of policy-based resource allocation in a parallel computing system. The parallel computing system, e.g., system 100 of FIG. 1, is configured under a first computing framework. The system is also configured to execute a user program written under a second computing framework. Under a policy-based resource allocation paradigm, the system maps requirements on resources by the user program to requests that can be understood by the system. The requirements can include data locality, process network distance, or process topology, in addition to single process resource requirements, e.g., requirements on central processing unit (CPU) cycles or memory resources. Various policies can be implemented.

Rules for satisfying requirements of various tasks for computing resources can be grouped as policies. Each policy includes a set of rules of allocating resources. Each user program can be associated with one or more policies that optimize performance of tasks specific to the user program. The user program can be associated with a policy that matches specific characteristics of the user program. For example, if a program requires more communication between its parallel components, a policy that allocates resources from fewer nodes can be selected to reduce amount of network communication.

In some implementations, rules can specify different dimensions on computing resources. Each dimension is an aspect of the computing resources that can have various values. Each dimension of computing resources can be combined with one or more other dimensions to define a plan of allocating the computing resources. The rules of different dimensions can combine or overlap or both.

At runtime, the requirements are expressed as resource allocation constraints enforced through negotiation between a scheduler 120 and a resource manager 114. The negotiation can be conducted using various communication protocols, remote procedure calls (RPCs). The scheduler 120 can be associated with multiple policy engines, for example, a first policy engine 202 and a second policy engine 204. Each of the first policy engine 202 and the second policy engine 204 can be a plugin component of the scheduler 120. The first policy engine 202 and the second policy engine 204 are each associated with a different policy. The first policy engine 202 and the second policy engine 204 can invoke analyzers that allocate computing resources to meet requirements of a user program and optimize the allocation. Each analyzer implements an algorithm targeting one dimension of computing resources. In the example shown, the analyzers include a fill-lack analyzer 206, a minimum-maximum (min-max) process per node analyzer 208, and a compute-locality analyzer 210. Details of the algorithms implemented by these analyzers are described below in reference to Listings 1-5.

For example, the first policy engine 202 is associated with the fill-lack analyzer 206. The second policy engine 204 is associated with the min-max process per node analyzer 208 and the compute-locality analyzer 210. Each of the policy engines 202 and 204 operates to satisfy a requirement of computing resources according to a respective policy through multiple iterations of providing input to the respective analyzers, receiving suggestions from the analyzers, deciding whether to modify the suggestions and whether to communicate to the resource manager 114 to request more resources or to release resources, until an optimal solution is reached under the respective policy or until timeout.

As an example, a user program may specify a compute-locality requirement and a requirement that each node executes a minimum number and a maximum number of processes. The second policy engine 204 is associated with a policy that matches these requirements. Accordingly, the second policy engine 204 may be selected to determine how computing resources are allocated among node computers of the system. The second policy engine 204 receives suggestions from the analyzer 208, which is an analyzer supporting a min-max process per node algorithm, as well as suggestions from the analyzer 210, which supports a compute-locality algorithm. Upon receiving the suggestions, the second policy engine 204 makes a final decision based on the suggestions, including determining an allocation that is compatible with the suggestions from both the analyzer 208 and the analyzer 210.

In some situations, computing resources initially provided by the resource manager 114 may not be able to satisfy the requirement of the decision made by the second policy engine 204. Likewise, in some situations, computing resources initially provided by the resource manager 114 may exceed the requirement of the decision made by the second policy engine 204. The first policy engine 202 and the second policy engine 204 may negotiate with the resource manager 114 through the scheduler 120 in multiple iterations to correct the deficiency or excess. The negotiation can be conducted using various protocols, e.g., RPCs.

In each iteration, resource allocation is further optimized over the resource allocation determined in a prior iteration, with the additional or reduced resources. The scheduler 120 can determine when to stop the iterations based on termination conditions. For example, the scheduler 120 can terminate the iterations upon detecting algorithm convergence. Each of the first policy engine 202 and the second policy engine 204 can include a function that measures improvements in the respective dimension. The function can include a weighted combination of improvement values reported by analyzers after each iteration. The weighted combination determines if an additional iteration will improve resource allocation. An additional iteration improves the resource allocation if the additional iteration will result in resource allocation that satisfies criteria specified in a request for resources to a higher degree. Upon determining that no improvement will result in an improvement, the scheduler can terminate the iterations.

In each iteration, each of the analyzers associated with any of the policy engines receives input on total resources, or capability, of a cluster of node computers executing the user program, including the resources of each node computer in the cluster. The analyzers receive input on allocated resources, resources requested, and number of node computers in the cluster. These inputs may be different from parameters provided to the resource manager 114 for allocating resources. The inputs to the resource manager 114 are under the framework of the parallel processing system. Whereas, the inputs to the analyzers 206, 208, and 210 can be additional inputs for adapting resource allocation of the framework to a foreign framework for executing the user program. Each of the analyzers 206, 208, and 210 can receive input represented below in Listing 1.

| Listing 1 | |
|---|---|
| Input | Description |
| n | Amount of resource(s) requested by a user program |
| m | Number of node computers in the parallel computing system clustered to execute the user program |
| C = {$c_1, c_2, \ldots c_m$} | C is total capability of node computers in the cluster, where $C_i$ is the capability of an i-th worker node computer |
| E = {$e_1, e_2, \ldots e_m$} | E is total allocated resources in the cluster, where $e_i$ is allocated resource of an i-th worker node computer |

Each of the analyzers 206, 208, and 210 produces an output that can be represented as D={$d_1, d_2, \ldots, d_m$}, where D represents the total changes in resource allocation, and $d_i$ represents changes in resource allocation at an i-th worker node computer, including a delta amount of resources at the i-th worker node computer. A positive $d_i$ indicates that an analyzer suggests allocating more resources at the i-th worker node computer. A negative $d_i$ indicates that an analyzer suggests releasing some resources at the i-th worker node computer. For example, an output of D={3, 0, −2} by an analyzer indicates that the analyzer suggests allocating three more units of resources for a first worker node computer, maintaining resources for a second worker node computer, and releasing two units of resources on a third worker node computer. The resources are resources corresponding to the dimension of the analyzer. An analyzer may suggest releasing resources in exchange for receiving better resources.

The analyzer 206 is an example fill lack analyzer that fills lacking resources, e.g., a deficiency of allocated resources compared to requested resources, when possible. Pseudo code of an algorithm used by the analyzer 206 is provided below in Listing 2. In Listing 2, and in subsequent listings, the notation ΣE represents a totality, e.g., a sum, of all elements in the set E.

```
                        Listing 2 begin
    D := {0}                    // initialing output
    lacking := n − ΣE           // get how many units of resources
                                // are lacking
    for ( i:= 0 to m ) {        // loop through nodes
        if (lacking > c_i − e_i) {
            d_i := c_i − e_i    // use all available resources of node i
            lacking := lacking − ( c_i − e_i )
        } else {
            d_i := lacking
            lacking := 0
        }
        if ( lacking = 0) {     // have enough resources
            break
        }
    }
    return D
end
```

The analyzer 208 is an example min-max resource analyzer that limits a minimum and maximum amount of resources used by a user program per worker node computer. For example, the analyzer 208 can arrange at least two units of resources per worker node computer and at most four units of resources per worker node computer. The analyzer 208 uses two additional parameters as input, "min" specifying a minimum amount of resources for each worker node computer, and "max" specifying a maximum amount of resources for each worker node computer. The analyzer 208 can use different software components to handle different cases. These different software components can be combined using a conditional or switch statement. Each different software component is described individually below.

In a first case, given that each worker node computer is allocated the minimum amount of resources, the total resources allocated are sufficient to satisfy the request of the user program. In this case, the analyzer 208 can use an algorithm that allocates the minimum amount of resources at each worker node computer. Pseudo code for the algorithm is provided below in Listing 3. In Listing 3, and in subsequent listings, the notation ||E|| represents a number of non-zero elements in the set E.

```
                        Listing 3 begin
    D := {0}                         // initialing output
    if ( ||E|| * min >= n ) {        // case 1: number of nodes times
                                     // minimum units satisfies
                                     // requirement
        for ( i:= 0 to m ) {         // loop through nodes
            if ( e_i < min) {
                d_i := min − e_i     // use un-used resources of node i
            }                        // end if
        }                            // end loop
    }
    return D
end
```

In a second case, if each worker node computer is allocated the minimum amount of resources, the total resources allocated cannot satisfy the request by the user program; whereas, if each worker node computer is allocated the maximum amount of resources, the total resources allocated can satisfy the request by the user program. In this case, the analyzer 208 can use an algorithm that determines a minimum amount resources "h" where, if h resources are allocated at each worker node computer, the total amount of resources will satisfy the request of the user program. The analyzer 208 can recommend filling each worker node computer that has less than h amount of resources to h. The algorithm attempts to allocate resources among worker node computers as evenly as possible. Pseudo code for the algorithm is provided below in Listing 4.

```
                        Listing 4 begin
    D := {0}                         // initialing output
    if ( ( ||E|| * min < n ) AND ( ||E|| * max >= n ) ) { // case 2
        find a minimum h satisfying ΣS_i >= n where
            if ( e_i < h ) {
                S_i := h
            } else {                 // if ( e_i >= h )
                S_i := e_i
            }
        for ( i:= 0 to m ) {         // loop through nodes
            if ( e_i < min) {
```

Listing 4

```
            d_i := min - e_i    // use un-used resources of node i
        } else
            d_i := 0
        }
      }
    }
    return D
end
```

In a third case, if each worker node computer is allocated the maximum amount of resources, the total resources allocated still cannot satisfy the request by the user program. In this case, the analyzer 208 suggests that the resource manager 114 provides more resources. The analyzer 208 can use an algorithm that first allocates all available resources to each worker node computer, and asks lacking amount of resources. Pseudo code for the algorithm is provided below in Listing 5.

Listing 5

```
begin
    D := {0}                                  // initialing output
    if ( ||E|| x max < n ) {                  // case 3
        lacking := n - ||E|| * max
        for ( i:= 0 to m ) {                  // loop through nodes
            if ( ( e_i = 0 ) AND ( lacking >0 ) ){
                if (lacking < max) {
                    d_i := lacking
                    lacking := 0
                } else {
                    d_i := max
                    lacking := lacking - max
                } // end if (lacking < max)
            } else {        // ( e_i <> 0 ) OR ( lacking <=0 )
                d_i := max - e_i // fill a node to max
            }
        }                                     // end loop
    }
    return D
end
```

The analyzer 210 is an example compute-locality analyzer that attempts to minimize allocated number of worker node computers. The analyzer 210 uses an algorithm that maximizes number of user processes executing on a worker node computer to reduce communication cost between processes. The algorithm can be similar to the algorithms of analyzer 208, except the min value is set to one, and the max value is set to maximum capacity in each worker node computer.

Figure 3:
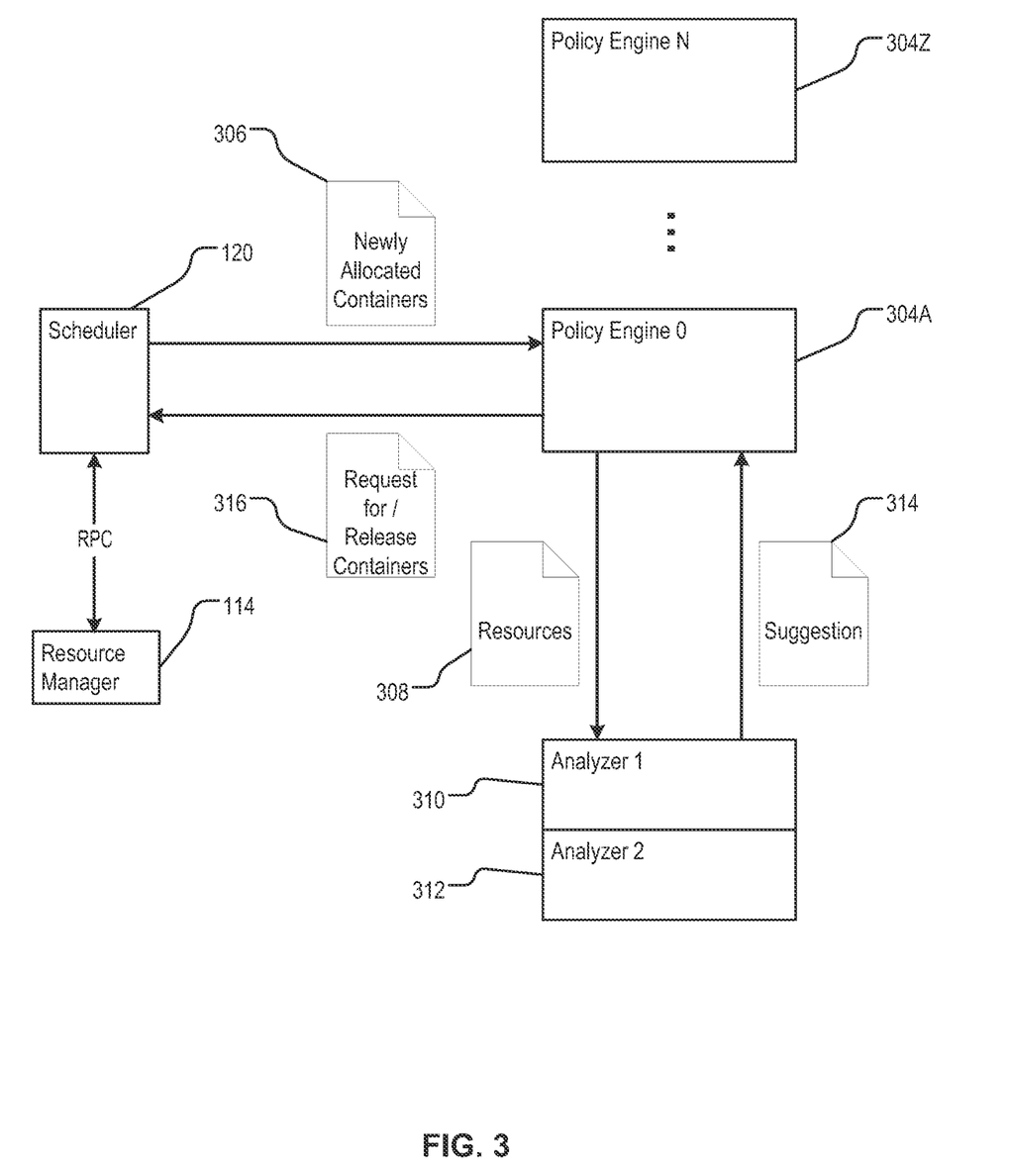
FIG. 3 is a block diagram illustrating an example workflow of policy-based resource allocation.

FIG. 3 is a block diagram illustrating an example workflow of policy-based resource allocation. A user program requires certain resources. The user program is associated with a policy that matches requirement of the user program. The policy is implemented by a policy engine 304A. The policy engine 304A is one policy engine among multiple policy engines 304A through 304Z. Each of the policy engines 304A through 304Z can be associated with a different policy.

A scheduler 120 receives a reference 306 to a newly allocated container provided by a resource manager 114. The scheduler 120 provides the reference 306 to the newly allocated container to the policy engine 304A. Upon receiving the reference 306, the policy engine 304A provides a reference 308 to the newly allocated container and existing resources to a first analyzer 310 and a second analyzer 312 for suggestions. Two analyzers 310 and 312 are shown. In various implementations, one single analyzer or more than two analyzers can be utilized.

Upon receiving the reference 308, each of the analyzers 310 and 312 calculates an allocation plan in a corresponding dimension. The analyzers 310 and 312 then provide the allocation plans to the policy engine 304A as suggestions 314. The suggestions 314 can include suggestions to allocate more resources or to release some of the existing resources.

The policy engine 304A combines the suggestions 314 from the analyzers 310 and 312 to determine a final allocation plan 316. The final allocation plan 316 can include request for additional containers or request to release allocated containers. The policy engine 304A provides the final allocation plan 316 to the resource manager 114 through the scheduler 120. The scheduler 120 can then receive another new container from the resource manager 114 in a next iteration. The iterations continue until a termination condition is satisfied, e.g., when sufficient amount of resources has been allocated to the user program or when allocation failed, due to time out.

Figure 4:
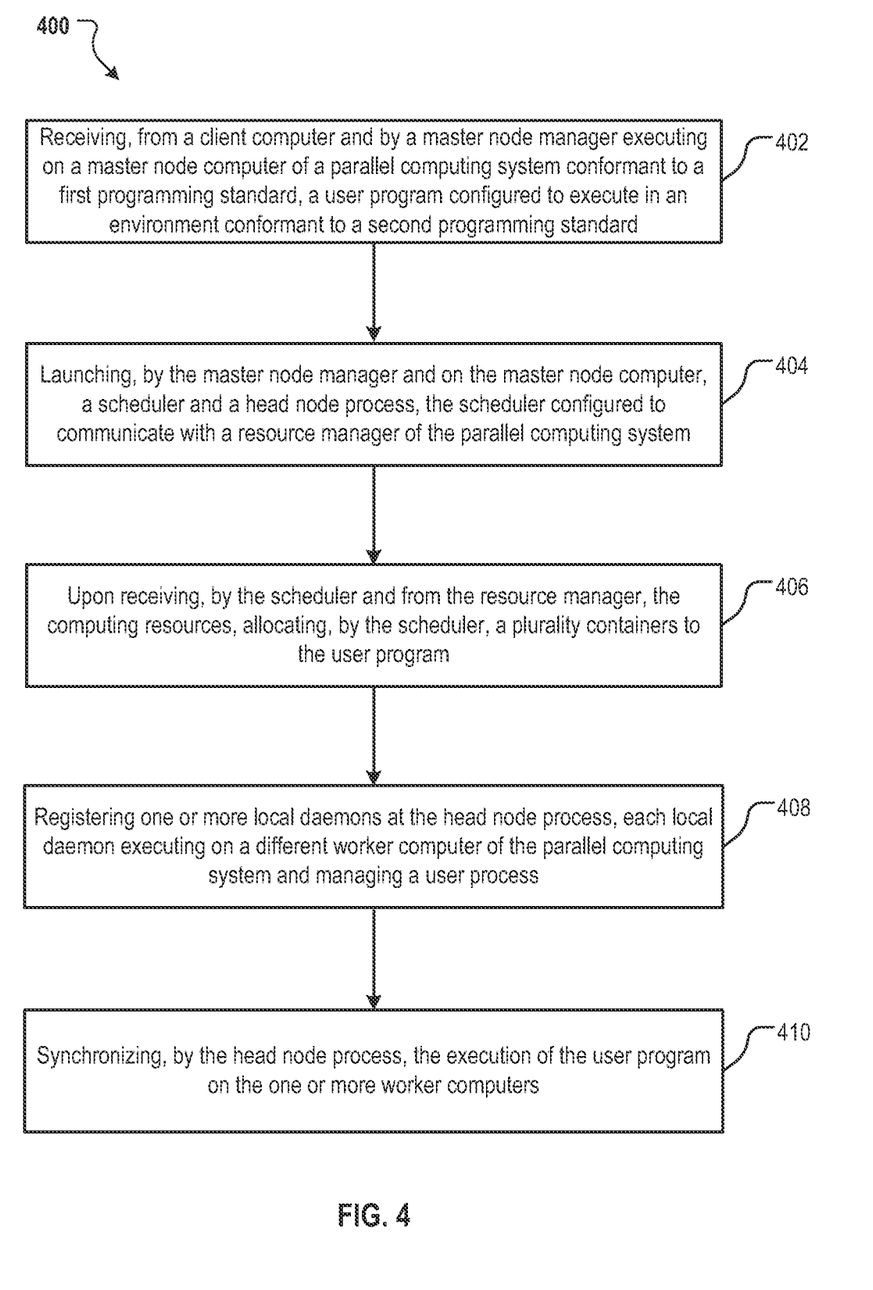
FIG. 4 is a flowchart illustrating an example process of executing a foreign program on a parallel computing system.

FIG. 4 is a flowchart illustrating an example process 400 of executing a foreign program on a parallel computing system. The parallel computing system can be the system 100 of FIG. 1.

The system receives (402), from a client computer, and by a master node manager executing on a master node computer of the parallel computing system, a user program. The parallel computing system is conformant to a first computing framework. The user program is foreign program written for a second computing framework and can execute in an environment conformant to the second computing framework. The second computing framework is different from the first computing framework. For example, the first computing framework can be a protocol based on Hadoop, and the second computing framework can be an MPI computing framework.

The master node manager of the system launches (404), on the master node computer, a scheduler and a head node process. The scheduler is configured to communicate with a resource manager of the parallel computing system. The resource manager is configured to provide computing resources in compliance to a protocol under the first computing framework. The head node process is conformant to the second computing framework and is configured to manage parallel execution of the user program on one or more worker node computers of the parallel computing system. The scheduler maps the computing resources provided by the resource manager to computing resources usable by the user program executing on the worker node computers.

Upon receiving, by the scheduler and from the resource manager, the computing resources, the scheduler allocates (406) containers to the user program. Each container is a portion of the computing resources available to the user program at a worker node computer of the parallel computing system. The container can include context information, e.g., a working directory, resource (CPU or memory), or a location where to store a log file, conformant to the first computing framework and file system location information specifying a location of at least a portion of a file system that is usable by the user program. After the scheduler allocates the containers, the head node process issues a non-blocking, call to the scheduler to request the scheduler to communicate with a respective worker node manager on each worker computer. Each worker node manager can cause a launch of the local daemon on a respective worker computer. The head node process then enters a loop state to monitor status of each local daemon until all of the local daemons terminate.

After receiving the non-blocking call from the head node process, the scheduler requests each worker node manager of a launch of a job. Upon receiving the request, each worker node manager performs a local launch of the user program on each respective worker node computer. To perform the local launch, each worker node manager starts a node service process that manages the container allocated to the respective worker node computer.

The system registers (408) one or more local daemons at the head node process. Each local daemon executes on a different worker computer of the parallel computing system and manages a user process. Each user process is an instance of execution of the user program on a respective worker computer using a respective container. To register the one or more local daemons at the head node process, each local daemon initializes each user process managed by the local daemon. Initializing the user process includes causing each user process to enter an initialization barrier configured to delay execution until each other user process has been initialized. After initializing the user process, the local daemon enters a monitoring mode. In the monitoring mode, the local daemon monitors event messages from the user process managed by the local daemon.

The head node process synchronizes (410) the execution of the user program on the one or more worker computers. As part of the synchronization, the head node process causes the one or more local daemons to start the user processes in parallel. The head node process notifies each registered local daemon that that all user processes has been initialized. In response, each local daemon then notifies each user process to leave the initialization barrier to start execution. The head node process continues to monitor execution of the user processes until the head node process determines all of the user processes have terminated. The head node process can then notify the client computer that the user program has finished execution.

Figure 5:
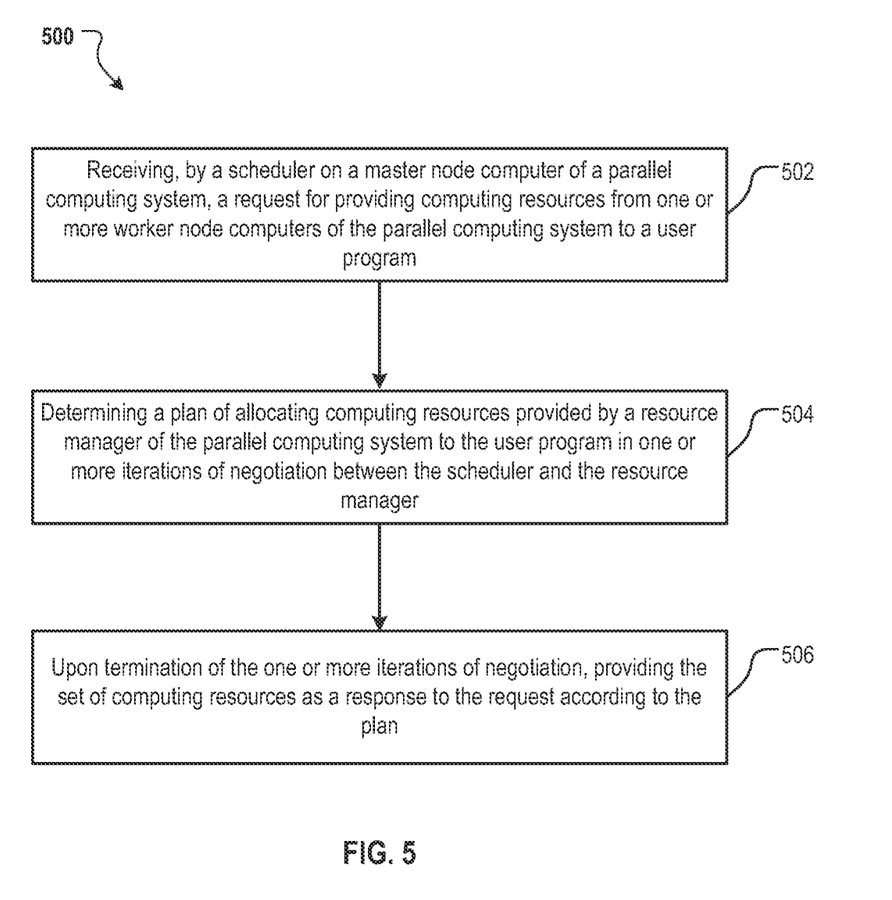
FIG. 5 is a flowchart illustrating an example process of policy-based resource allocation on a parallel computing system.

FIG. 5 is a flowchart illustrating an example process 500 of policy-based resource allocation on a parallel computing system. The parallel computing system can be the system 100 of FIG. 1.

A scheduler on a master node computer of the parallel computing system receives (502) a request for providing computing resources from one or more worker node computers of the parallel computing system to a user program. The computing resources are managed by a resource manager of the parallel computing system. In some implementations, the request includes a first request dimension and a second request dimension, each request dimension specifying a different attribute of the computing resources requested.

The system determines (504) a plan of allocating computing resources to the user program in one or more iterations of negotiation between the scheduler and the resource manager. In each iteration, a policy engine associated with the scheduler determines a tentative plan of allocating the computing resources of the one or more worker node computers. The policy engine determines the tentative plan following an allocation policy that is selected by a user for the user program. The tentative plan includes at least one of (1) getting computing resources from one of the one or more worker node computers or (2) releasing at least a portion of the computing resources of one of the one or more work node computers that has been already allocated to the user program.

To determine the tentative plan, the policy engine receives, from an analyzer, a suggestion on whether to get or to release the computing resources and decides whether to get or to release the computing resources according to the suggestion and the policy. The analyzer can be a reusable plugin component of the policy engine. Based on the decision, the scheduler can request computing resources from the resource manager or release the computing resources to the resource manager. The one or more iterations of negotiation terminate when a termination condition is satisfied. For example, the iterations can terminate when (1) a collection of computing resources from the worker node computers satisfies the request and (2) allocation of the computing resources in the collection among the worker node computers satisfies the policy.

In some implementations, the analyzer can be a process configured to compensate for a lack of computing resources on a first worker computer with available computing resources on a second worker node computer. The analyzer can include the algorithm described in reference to Listing 2. In some implementations, the analyzer can be a process configured to limit a minimum amount and a maximum amount of computing resources used by jobs executing on each worker node computer. The analyzer can include the algorithm described in reference to Listings 3, 4, and 5. In some implementations, the analyzer can be a process configured to minimize a number of non-master node computers that provide the computing resources. The analyzer can include the compute-locality analyzer as described in reference to FIG. 2

In implementations where the request includes a first request dimension and a second request dimension, the policy engine can have a first analyzer and a second analyzer. The first analyzer and second analyzer correspond to the first request dimension and second request dimension, respectively. Each of the first analyzer and second analyzer can provide an independent suggestion of the corresponding dimension. To decide whether to get or to release the computing resources according to the suggestion and the policy, the policy engine combines the first suggestion and the second suggestion and makes a decision that accommodates both the first suggestion and the suggestion. Each of the first suggestion and the second suggestion includes a get suggestion to allocate more computing resources at a worker node computer and a release suggestion to release already allocated computing resources at a worker node computer.

For example, the first dimension and second dimension correspond to a first attribute and a second attribute of the request, respectively. Each of the first attribute and the second attribute includes one of a data locality requirement or a minimum-maximum resource requirement. The data locality requirement specifies that the computing resources allocated to the user program be provided by as few worker node computers as possible. The minimum-maximum resource requirement specifying a minimum amount and a maximum amount of computing resources from each worker node computer. The policy engine can then determine the computing resources that are from the fewest number of worker node computers where on each worker node computer, resources allocated to the user program do not exceed the maximum amount of computing resources.

In some implementations, the one or more iterations of negotiation terminate when a user defined termination condition is satisfied. In some implementations, the one or more iterations of negotiation terminate when a convergence condition is satisfied. The resource analyzer includes a function measuring improvement in computing resources allocation in a respective dimension. The policy engine determines that the convergence condition is satisfied when the improvement over a last iteration satisfies a threshold value. Upon termination of the one or more iterations of negotiation, the scheduler provides (506) the set of computing resources as a response to the request according to the plan.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA or an ASIC.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   receiving, by a scheduler on a master node computer of a parallel computing system configured to operate under a first computing framework, a request to allocate computing resources of two or more worker node computers of the parallel computing system to execute a user program written according to standards of a message passing interface (MPI) framework that is different from the first computing framework, wherein the user program is associated with one or more resource execution requirements that are specific to the MPI framework;
   performing one or more iterations of resource negotiation using the one or more resource execution requirements specific to the MPI framework to generate a final plan that specifies a final allocation of computing resources for the user program in a resource allocation protocol of the first computing framework, each iteration of negotiation comprising:
      receiving, by a policy engine, a suggested allocation of requesting or releasing computing resources to satisfy one or more computing resource requirements of the user program in the MPI framework; and
      updating, by the policy engine, a tentative plan of allocating the computing resources of the two or more worker node computers according to the suggested allocation;
      updating a current allocation of computing resources for the user program including requesting from a resource manager or releasing to the resource manager, based on the tentative plan, one or more containers, each container comprising one or more computing resources;
   wherein the one or more iterations of resource negotiation terminate when the scheduler determines that a collection of containers from the two or more worker node computers satisfies the one or more computing resource requirements of the user program written according to the standards of the MPI framework; and
   upon termination of the one or more iterations of resource negotiation, performing operations comprising:
   updating the final plan based on the tentative plan after termination of the one or more iterations,
   using the final plan that specifies resource requests in the resource allocation protocol of the first computing framework to allocate the collection of containers to the user program as a response to the request,
   allocating a plurality of tasks for executing the user program and mapping each task to a respective container in the collection of containers, and
   launching, by the scheduler, the plurality of tasks in parallel, including invoking a respective worker node manager on each worker node computer to manage the containers on the worker node computer.

2. The method of claim 1, wherein:
   the request includes a first dimension to the request and a second dimension to the request, each dimension to the request specifying a respective resource execution requirement of the one or more resource execution requirements associated with the user program; and
   wherein each iteration of negotiation further comprises:
      providing, to a first analyzer, the tentative plan of allocating the computing resources and the first dimension to the request,
      providing, to a second analyzer, the tentative plan of allocating the computing resources and the second dimension to the request,
      wherein the first analyzer and the second analyzer map a respective resource execution requirement of the user program to a suggested allocation of computing resources to satisfy the respective resource execution requirement,
      receiving a first suggested allocation of computing resources from the first analyzer and a second suggested allocation of computing resources from the second analyzer, and
      wherein updating, by the policy engine, the tentative plan further comprises updating the tentative plan according to the first and the second suggested allocation of computing resources.

3. The method of claim 2, wherein:
   the first and the second dimension specify a respective one of a data locality requirement or a minimum-maximum resource requirement, the data locality requirement specifying that the computing resources allocated to the user program be provided by as few worker node computers as possible, the minimum-maximum resource requirement specifying a minimum amount and a maximum amount of computing resources from each worker node computer.

4. The method of claim 1, wherein the one or more iterations of resource negotiation terminate when the scheduler determines that a collection of containers from the two or more worker node computers satisfies the one or more computing resource requirements and when a user-defined condition is satisfied, wherein the user-defined condition is part of the request.

5. The method of claim 2, wherein the one or more iterations of resource negotiation terminate when the scheduler determines that a collection of containers from the two or more worker node computers satisfies the one or more computing resource requirements of the user program and when a convergence condition is satisfied, and wherein:
either the first analyzer or the second analyzer includes a function measuring improvement in computing resource allocation in a respective dimension, and
the policy engine determines that the convergence condition is satisfied when the improvement over a last iteration satisfies a threshold.

6. The method of claim 2, wherein either the first analyzer or the second analyzer is one of:
a process configured to compensate for a lack of computing resources on a first worker node computer with available computing resources on a second worker node computer;
a process configured to limit a minimum amount and a maximum amount of computing resources used by jobs executing on each worker node computer; or
a process configured to minimize a number of non-master node computers that provide the computing resources.

7. The method of claim 1, wherein the first computing framework does not natively implement the MPI framework.

8. One or more non-transitory storage devices storing instructions operable to cause one or more computers to perform operations comprising:
receiving, by a scheduler on a master node computer of a parallel computing system configured to operate under a first computing framework, a request to allocate computing resources of two or more worker node computers of the parallel computing system to a user program written according to standards of a message passing interface (MPI) framework that is different from the first computing framework, wherein the user program is associated with, one or more resource execution requirements that are specific to the MPI framework,
performing one or more iterations of resource negotiation using the one or more resource execution requirements specific to the MPI framework to generate a final plan that specifies a final allocation of computing resources for the user program in a resource allocation protocol of the first computing framework, each iteration of negotiation comprising:
receiving, by a policy engine, a suggested allocation of requesting or releasing computing resources to satisfy the one or more computing resource requirements of the user program in the MPI framework;
updating, by the policy engine, a tentative plan of allocating the computing resources of the two or more worker node computers according to the suggested allocation;
updating a current allocation of computing resources for the user program including requesting from a resource manager or releasing to the resource manager, based on the tentative plan, one or more containers, each container comprising one or more computing resources;
wherein the one or more iterations of resource negotiation terminate when the scheduler determines that a collection of containers from the two or more worker node computers satisfies the one or more computing resource requirements of the user program written according to the standards of the MPI framework; and
upon termination of the one or more iterations of resource negotiation, performing operations comprising:
updating the final plan based on the tentative plan after termination of the one or more iterations,
using the final plan that specifies resource requests in the resource allocation protocol of the first computing framework to allocate the collection of containers to the user program as a response to the request,
allocating a plurality of tasks for executing the user program and mapping each task to a respective container in the collection of containers, and
launching, by the scheduler, the plurality of tasks in parallel, including invoking a respective worker node manager on each worker node computer to manage the containers on the worker node computer.

9. The one or more non-transitory storage devices of claim 8, wherein:
the request includes a first dimension to the request and a second dimension to the request, each dimension to the request specifying a respective resource execution requirement of the one or more resource execution requirements associated with the user program; and
wherein each iteration of negotiation further comprises:
providing, to a first analyzer, the tentative plan of allocating the computing resources and the first dimension to the request,
providing, to a second analyzer, the tentative plan of allocating the computing resources and the second dimension to the request,
wherein the first analyzer and the second analyzer map a respective resource execution requirement of the user program to a suggested allocation of computing resources to satisfy the respective resource execution requirement,
receiving a first suggested allocation of computing resources from the first analyzer and a second suggested allocation of computing resources from the second analyzer, and
wherein updating, by the policy engine, the tentative plan further comprises updating the tentative plan according to the first and the second suggested allocation of computing resources.

10. The one or more non-transitory storage devices of claim 9, wherein:
the first and the second dimension specify a respective one of a data locality requirement or a minimum-maximum resource requirement, the data locality requirement specifying that the computing resources allocated to the user program be provided by as few worker node computers as possible, the minimum-maximum resource requirement specifying a minimum amount and a maximum amount of computing resources from each worker node computer.

11. The one or more non-transitory storage devices of claim 9, wherein the one or more iterations of resource negotiation terminate when the scheduler determines that a collection of containers from the two or more worker node computers satisfies the one or more computing resource requirements of the user program and when a user-defined condition is satisfied, wherein the user-defined condition is part of the request.

12. The one or more non-transitory storage devices of claim 9, wherein the one or more iterations of resource negotiation terminate when the scheduler determines that a collection of containers from the two or more worker node computers satisfies the one or more computing resource requirements of the user program and when a convergence condition is satisfied, and wherein:

either the first analyzer or the second analyzer includes a function measuring improvement in computing resource allocation in a respective dimension, and     the policy engine determines that the convergence condition is satisfied when the improvement over a last iteration satisfies a threshold.

13. The one or more non-transitory storage devices of claim 9, wherein either the first analyzer or the second analyzer is one of:

a process configured to compensate for a lack of computing resources on a first worker node computer with available computing resources on a second worker node computer;

a process configured to limit a minimum amount and a maximum amount of computing resources used by jobs executing on each worker node computer; or     a process configured to minimize a number of non-master node computers that provide the computing resources.

14. The one or more non-transitory storage devices of claim 8, wherein the first computing framework does not natively implement the MPI framework.

15. A system comprising:

one or more computers; and one or more non-transitory storage devices storing instructions operable to cause the one or more computers to perform operations comprising:

receiving, by a scheduler on a master node computer of a parallel computing system configured to operate under a first computing framework, a request to allocate computing resources of two or more worker node computers of the parallel computing system to execute a user program written according to standards of a message passing interface (MPI) framework that is different from the first computing framework, wherein the user program is associated with one or more resource execution requirements that are specific to the MPI framework;

performing one or more iterations of resource negotiation using the one or more resource execution requirements specific to the MPI framework to generate a final plan that specifies a final allocation of computing resources for the user program in a resource allocation protocol of the first computing framework, each iteration of negotiation comprising:

receiving, by a policy engine, a suggested allocation of requesting or releasing computing resources to satisfy one or more computing resource requirements of the user program in the MPI framework; and         updating, by the policy engine, a tentative plan of allocating the computing resources of the two or more worker node computers according to the suggested allocation;

updating a current allocation of computing resources for the user program including requesting from a resource manager or releasing to the resource manager, based on the tentative plan, one or more containers, each container comprising one or more computing resources;

wherein the one or more iterations of resource negotiation terminate when the scheduler determines that a collection of containers from the two or more worker node computers satisfies the one or more computing resource requirements of the user program written according to the standards of the MPI framework; and     upon termination of the one or more iterations of resource negotiation, performing operations comprising:

updating the final plan based on the tentative plan after termination of the one or more iterations,         using the final plan that specifies resource requests in the resource allocation protocol of the first computing framework to allocate the collection of containers to the user program as a response to the request,         allocating a plurality of tasks for executing the user program and mapping each task to a respective container in the collection of containers, and         launching, by the scheduler, the plurality of tasks in parallel, including invoking a respective worker node manager on each worker node computer to manage the containers on the worker node computer.

16. The system of claim 15, wherein:

the request includes a first dimension to the request and a second dimension to the request, each dimension to the request specifying a respective resource execution requirement of the one or more resource execution requirements associated with the user program; and wherein each iteration of negotiation further comprises:

providing, to a first analyzer, the tentative plan of allocating the computing resources and the first dimension to the request,     providing, to a second analyzer, the tentative plan of allocating the computing resources and the second dimension to the request,     wherein the first analyzer and the second analyzer map a respective resource execution requirement of the user program to a suggested allocation of computing resources to satisfy the respective resource execution requirement,     receiving a first suggested allocation of computing resources from the first analyzer and a second suggested allocation of computing resources from the second analyzer, and     wherein updating, by the policy engine, the tentative plan further comprises updating the tentative plan according to the first and the second suggested allocation of computing resources.

17. The system of claim 16, wherein:

the first and the second dimension specify a respective one of a data locality requirement or a minimum-maximum resource requirement, the data locality requirement specifying that the computing resources allocated to the user program be provided by as few worker node computers as possible, the minimum-maximum resource requirement specifying a minimum amount and a maximum amount of computing resources from each worker node computer.

18. The system of claim 16, wherein the one or more iterations of resource negotiation terminate when the scheduler determines that a collection of containers from the two or more worker node computers satisfies the one or more computing resource requirements and when a user-defined condition is satisfied, wherein the user-defined condition is part of the request.

19. The system of claim 16, wherein the one or more iterations of resource negotiation terminate when the scheduler determines that a collection of containers from the two or more worker node computers satisfies the one or more computing resource requirements of the user program and when a convergence condition is satisfied, and wherein:

either the first analyzer or the second analyzer includes a function measuring improvement in computing resource allocation in a respective dimension, and the policy engine determines that the convergence condition is satisfied when the improvement over a last iteration satisfies a threshold.

20. The system of claim 16, wherein either the first analyzer or the second analyzer is one of:

a process configured to compensate for a lack of computing resources on a first worker node computer with available computing resources on a second worker node computer;

a process configured to limit a minimum amount and a maximum amount of computing resources used by jobs executing on each worker node computer; or a process configured to minimize a number of non-master node computers that provide the computing resources.

21. The system of claim 15, wherein the first computing framework does not natively implement the MPI framework.

* * * * *